March 10, 1959  J. G. SHAW, JR  2,876,875
APPARATUS FOR CONTROLLING SPEED OF AUTOMOTIVE VEHICLES
Filed Jan. 24, 1955  2 Sheets-Sheet 1
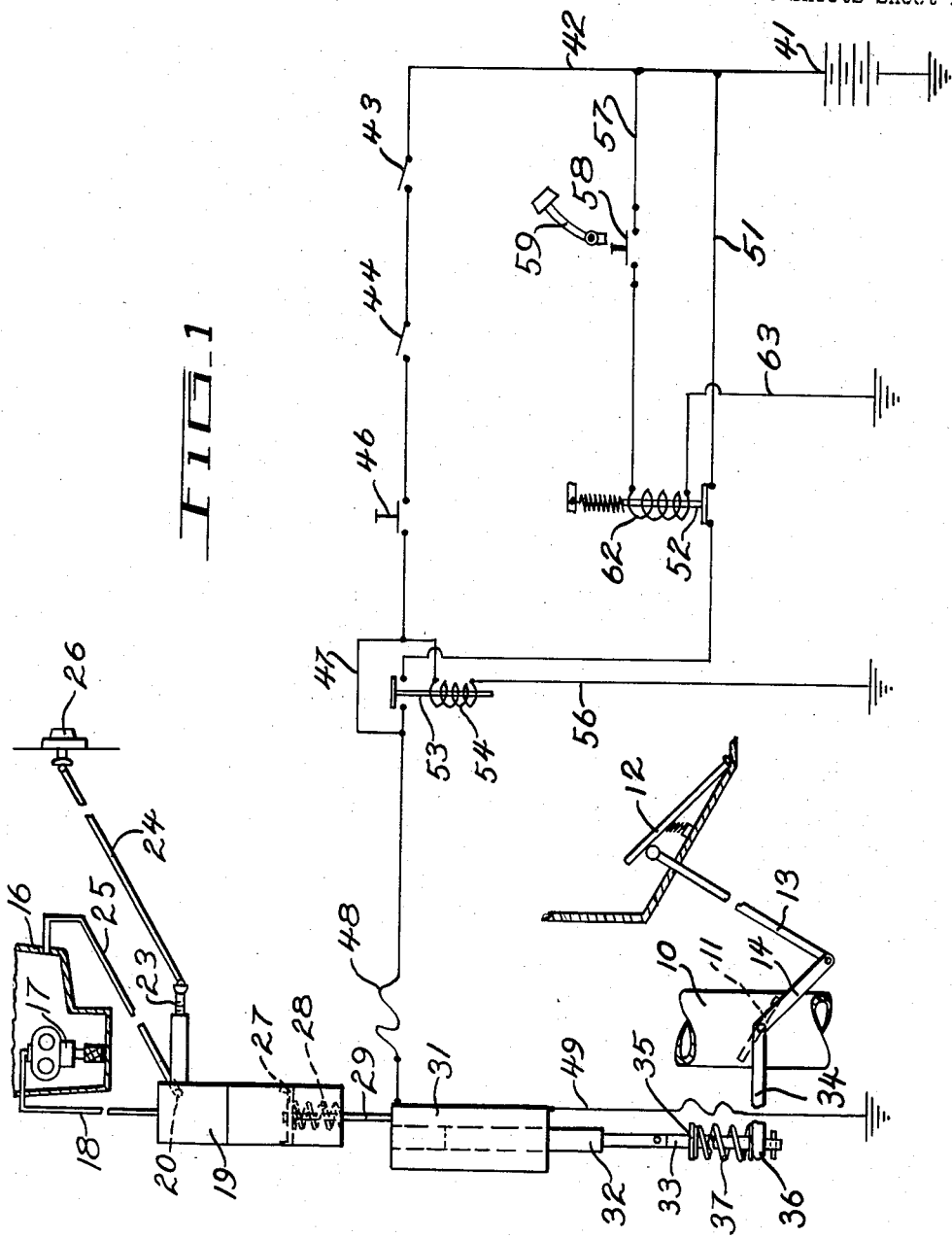
INVENTOR.
JACK G. SHAW JR.
BY
Jennings & Carter
ATTORNEYS

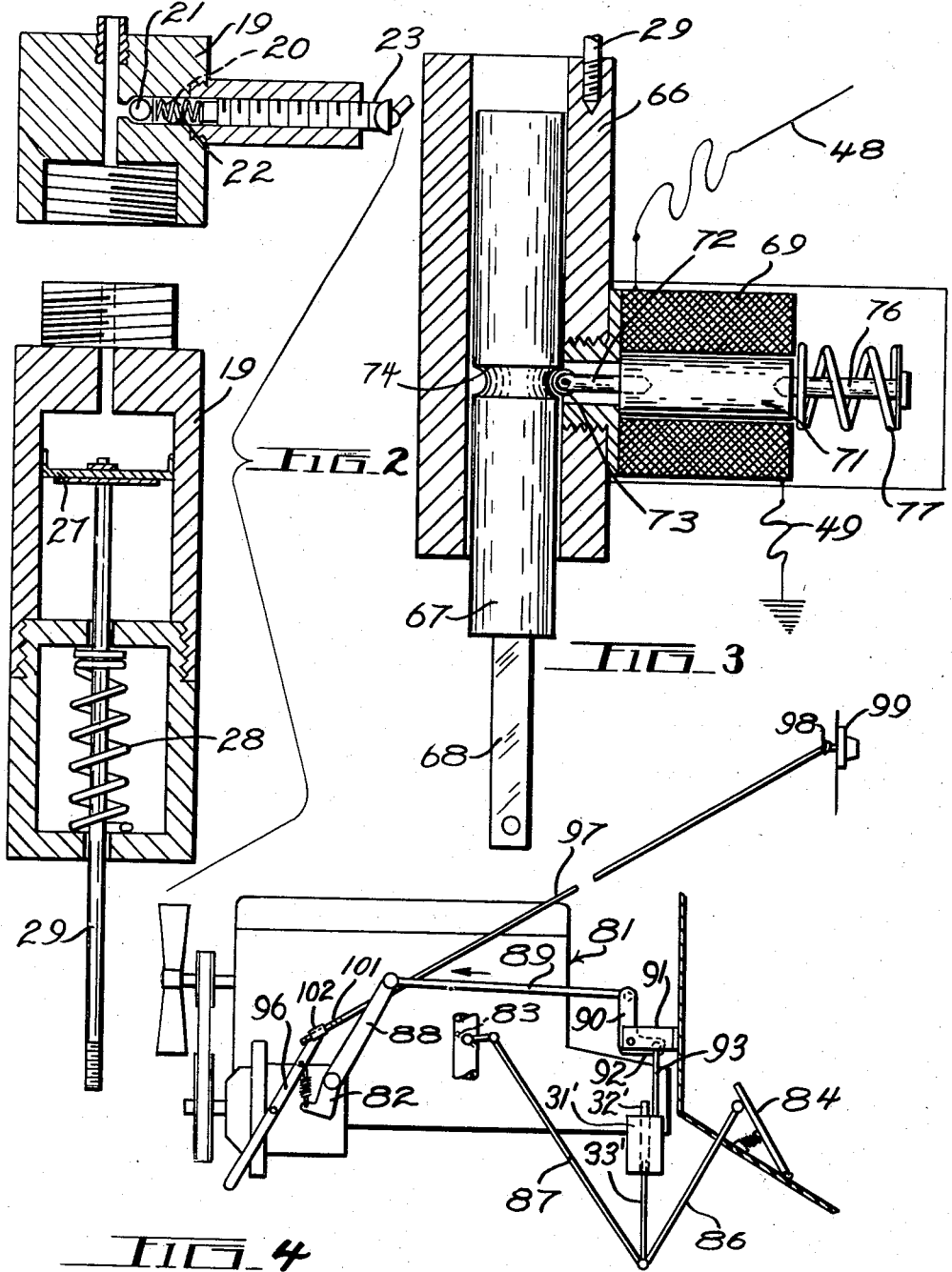

United States Patent Office 2,876,875
Patented Mar. 10, 1959

2,876,875

APPARATUS FOR CONTROLLING SPEED OF AUTOMOTIVE VEHICLES

Jack G. Shaw, Jr., Birmingham, Ala., assignor of one-fourth to Douglas S. Palmer and one-fourth to G. Saxton Lawrence, both of Birmingham, Ala.

Application January 24, 1955, Serial No. 483,610

7 Claims. (Cl. 192—3)

This invention relates to a speed control device for an automotive vehicle and has for an object the provision of simple effective means providing a variable predetermined uniform cruising speed for such a vehicle, without interfering with the manual control of the vehicle.

A further object of my invention is to provide a speed control device for internal combustion engines, especially engines employed to drive automotive vehicles, which shall include control means operable responsive to the angular velocity of a rotating part associated with the engine and having a movable part operatively and detachably connected to the fuel supply valve of the engine, together with selective means for connecting said device with and disconnecting it from the fuel supply valve.

A more specific object of my invention is to provide a speed control device for an automotive vehicle driven by an internal combustion engine which shall include a member operatively connected to the fuel supply valve of the engine together with means operable responsive to the angular velocity of a rotating part associated with the engine including a second member adapted to be connected with said first mentioned member and biased when so connected in a direction to open said valve, and means operable selectively to connect and disconnect said first and second mentioned members.

A still further object of my invention is to provide a speed control device for an automotive vehicle including means for maintaining a predetermined cruising speed independently of the manual control usually associated with such vehicles and electro-magnetic means operable selectively to connect and disconnect said means.

As is well understood in the art to which my invention relates, drivers of automotive vehicles who are obliged to remain on the road for hours at a time are subject to great fatigue and nervous strain in order to maintain a cruising speed of the vehicle within the legal limits of the territory in which the vehicle is being operated. It is accordingly highly important that some means be provided whereby the cruising speed of the vehicle may be governed automatically and yet be of such character that the driver of the vehicle may resume control, instantly, when circumstances so require. The foregoing and other difficulties are overcome by means of my invention, in which I provide means responsive to the speed of the engine, or vehicle, which controls the cruising speed of the vehicle and which is connected electro-magnetically with the usual manual control of the vehicle. The electro-magnetic means may be de-energized, responsive to moving the brake on the vehicle toward applied position or by the manual operation of a switch by the driver.

Apparatus embodying features of my invention is illustrated in the accompanying drawings forming a part of this application in which:

Fig. 1 is a diagrammatic view showing one form of my invention;

Fig. 2 is a vertical sectional view drawn to a larger scale showing a fluid motor employed with my invention;

Fig. 3 is a view showing a modified means of connecting the speed control device to the fuel valve; and, Fig. 4 is a view showing a modified form of my invention employing a mechanical rather than a hydraulic form of speed responsive device.

Referring to the drawings for a better understanding of my invention I show in Fig. 1 fragmentary parts of an automotive vehicle and engine including a fuel supply conduit 10 for the engine having the usual fuel supply valve 11 located therein. The fuel supply valve 11 may be operated by the usual pedal accelerator 12 through suitable linkage 13 connected to an operating arm 14 for the valve. At 16 I show an oil reservoir associated with the engine which, as is well understood, may be a part of the oil supply for the engine or may be associated with the vehicle drive shaft or other rotating part. Located in the reservoir 16 is a pump 17 driven by a rotating part associated with the engine and which delivers oil under pressure varying with the angular velocity of the rotating part, through a conduit 18 to a hydraulic cylinder 19. Located in the upper end of the cylinder 19 is a spring pressed by-pass valve 21 which limits the pressure in the upper end of the cylinder, see Fig. 2. Fluid passing the valve 21 passes through a port 20 and conduit 25 back to the reservoir 16. A spring 22 bears against the valve 21 and the tension of the spring may be varied by means of an adjusting screw 23 which is moved by means of an operating rod 24 and handle 26 located at some suitable, accessible part on the vehicle. Mounted in the cylinder 19 is a piston 27 which is biased upwardly by means of a spring 28. The piston rod 29 is connected at its lower end to an electro magnetic device, such as a solenoid 31, so that the solenoid is supported by, and movable with, the piston 27. The armature, or core 32 of the solenoid is connected at its lower end through a link 33 with an operating handle 34 of the fuel valve 11. Preferably, the connection with the arm 34 is a sliding connection as shown at 36 with a spring 37 surrounding the link 33 and bearing against a collar 35 on the link whereby the valve 11 may be moved by the foot pedal 12 through the linkage 13 in an opening direction against downward pressure on the arm 34 by the core 32 and the spring 37.

At 41 I show the usual battery associated with an automotive vehicle with a wire 42 leading to an ignition switch 43. The wire 42 continues through a manually operable control switch 44 and thence through a push button switch 46 for momentarily closing the circuit. The circuit continues through a shunt wire 47 and thence through a flexible connection 48 to the solenoid 31 which is connected to the ground through a flexible ground connection 49.

A holding circuit for the solenoid 31 is comprised of a wire 51 leading from the wire 42 through a normally closed electro-magnetic switch or relay 52 to a normally open electro-magnetic switch or relay 53 and thence through the flexible connection 48 to the solenoid 31. With the switches 43 and 44 closed, if the push button switch 46 be closed, the solenoid 31 is momentarily energized from the circuit through the wire 42 and shunt 47 and flexible lead 48. The shunt 47 is also connected to the operating coil 54 of the electro-magnetic switch 53 and the latter is connected to the ground through a ground connection 56. When the push button 46 is closed, a circuit is established from the shunt 47 through the coil 54 and thence to the ground thereby establishing a holding circuit for the solenoid 31 from the wire 51, normally closed switch 52, and electro-magnetic switch 53.

With the solenoid 31 energized, the armature, or core 32 is pulled up into the solenoid thus moving the fuel valve 11 in an opening direction, the spring 28 acting against the piston 27 biases the fuel valve in an opening direction. The pressure in the upper end of the cylinder 19, acting against the piston 27, resists this opening movement. As long as the pressure in the upper end of the cylinder 19 is below the setting of the by-pass valve 21, the fuel valve 11 will remain open, assuming a position wherein the upward force of the spring 28 is balanced by the downward force of pressure on the piston 27. When the pressure in the upper end of the cylinder 19 equals the setting of the by-pass valve 21 and is greater than the tension of the spring 28, the piston 27 is moved downwardly to close the fuel valve 11.

If it be desired to increase the speed of the vehicle above that determined by the setting of the valve 21 and the force exerted against the piston 27, the accelerator pedal 12 may be depressed, in the usual way, to open the valve 11, the sliding connection between the arm 34 and the link 33 as well as the yieldable magnetic connection between the solenoid 31 and core 32 providing means whereby this may be accomplished independently of the automatic control just described.

In order to slow the vehicle down below the cruising speed determined by the setting of the automatic control described, I provide a deenergizing circuit from the wire 42 through a wire 57 having a normally open switch 58 therein operated from the brake pedal 59 and extending to the operating coil 62 of the normally closed switch 52, the coil being connected to the ground through a wire 63. Thus, when the brake pedal 59 is depressed, the coil 62 is energized, opening the switch 52 which breaks the circuit to the solenoid 31 and also the circuit to the operating coil 54 of the normally open switch 53. The electromagnetic device 31 is thus deenergized and manual control re-established. To place the automatic speed control in operation again, it is only necessary to close the push button switch 46 momentarily as previously described and thus energize the electromagnetic device 31. This switch, as is well understood, is located where it is readily accessible to the driver of the vehicle.

While I have shown and described a conventional fluid pressure cylinder and piston for controlling the fuel valve 11 it will be understood that various forms of pressure responsive devices may be employed all of which are well known in the art.

In Fig. 3 of the drawing I show a modified form of my invention in which the piston rod 29, instead of being connected directly to the solenoid as shown in Fig. 1, is connected to a sleeve 66 in which a plunger 67 is freely slidable. The plunger 67 has a link 68 on its lower end which is adapted to be connected through suitable linkage to the fuel supply valve 11 in the same manner as the core 32 of the solenoid 31 illustrated in Fig. 1. Mounted on the side of the sleeve 66 is a solenoid 69 having a core 71 in which is mounted a stem 72 extending into the sleeve 66. Carried on the inner end of the stem 72 is a roller 73 which, when the plunger 67 is in the position shown in Fig. 3 of the drawing is seated in a groove 74 formed in the plunger. On the outer end of the core 71 is a stem 76 surrounded by a spring 77 which biases the core 71 of the solenoid and its stem and roller 72 outwardly to release the roller from the groove 74. The solenoid 69 is energized from a source of electrical energy through the flexible lead 48 and flexible ground wire 49 in the same manner as described for the solenoid 31 in Fig. 1 of the drawing.

It will be seen that with this construction, the solenoid 69 when energized draws the core 71 inwardly to engage the roller with the groove 74 in the plunger 67 as shown in Fig. 3 of the drawing and thus forms a yieldable latch or connection between the pressure cylinder 19 and the plunger 67 to operate the fuel valve 11. In the operation of this modification of my invention, with the vehicle or engine in motion, the solenoid 69 is energized and the fuel valve 11 is moved by means of the accelerator to move the arm 34 and with it the link 68 and plunger 67 until the roller 73 drops into the groove 74, whereupon the hydraulic cylinder 19 is yieldably connected to the fuel valve through the sleeve 66 and plunger 67. The apparatus then operates as already described in connection with Fig. 1, except that whenever it is desired to increase the speed of the vehicle momentarily above that determined by the setting of the by-pass valve 21, the accelerator may be pressed downward to raise the arm 34 and plunger 68 whereupon the roller 73 may be forced out of the groove 74 and the plunger 67 will then operate in the sleeve 66 freely to provide for greater speed. As soon as the need for increased speed is over the plunger 67 may be returned to the position shown in Fig. 3 of the drawing.

Referring now to Fig. 4 of the drawing I show a further modified form of my invention in which an internal combustion engine 81 is provided with a conventional speed responsive mechanical governor 82. The fuel valve for the engine is indicated at 83, and the accelerator pedal at 84 with linkage 86, 87, leading to the fuel valve. A movable arm 88 is actuated by the speed responsive governor 82 in a manner well understood, moving toward the left, as viewed in the drawing, responsive to increased speed. Connected to the outer end of the arm 88 is a link 89 with its outer end connected to one arm 90 of a bell crank lever mounted on a stationary part 91. The other arm 92 of the bell crank lever is connected by means of a link 93 to a solenoid 31' which, it will be understood, is supported by and moves with the link and is energized and de-energized in the same manner as the solenoid 31 illustrated in Fig. 1 of the drawing. The core 32' is connected by a link 33' to the linkage 86, 87, already described for operating the fuel valve 83. Also, it will be understood that the sleeve and plunger connection shown in Fig. 3 may be employed.

The operation of this modification of my invention will be readily apparent. When the solenoid 31' is de-energized, the vehicle is under the sole control of the driver, the speed being controlled by the manually operable accelerator 84. When the solenoid 31' is energized in the manner described for solenoid 31 in Fig. 1, the core 32' of the solenoid 31' is magnetically joined to the solenoid and the speed control of the vehicle is taken over by the mechanical governor 82. As the speed increases, the movable arm 88 moves to the left, as viewed in Fig. 4 of the drawing, thus raising the solenoid 31' and with it the linkage 86, 87 to move the valve 83 in a closing direction. Upon a decrease in speed, the arm 88 moves to the right, thus lowering the solenoid 31' and with it the linkage 86, 87 to move the fuel valve 83 in an opening direction thus supplying more fuel to the engine. When increased speed is required, the pedal 84 may be depressed, overcoming the magnetic connection between the solenoid 31' and its core 32' and opening the fuel valve wider.

An adjusting arm 96 is provided on the governor 82 which is connected through linkage 97 and a universal joint 98 to an operating handle, or wheel 99 which may be mounted on the dash of the vehicle. The inner end of the link 97 is threaded as shown at 101 and passes through a threaded sleeve 102 pivotally mounted on the outer end of the adjusting arm 96. By this means the setting of the governor 82 may be varied and thus the speed of the vehicle, as determined by the governor 82 may be varied.

From the foregoing it will be apparent that I have devised an improved speed control apparatus for automotive vehicles which is simple of design, safe and reliable in operation, and one which will provide for any uniform cruising speed for a vehicle as selected by the driver.

While I have shown my invention in three forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. The combination with an internal combustion engine having a fuel delivery passage associated therewith together with a valve in said passage controlling the flow of fuel therethrough and a manually operable accelerator with suitable linkage for controlling the position of said valve, of other means controlling the position of said valve independently of the accelerator comprising an electromagnetic device having relatively movable parts one of which is operatively connected to said valve, a device operable responsive to angular speed of a rotating part associated with the engine and having a movable part to which the other of said relatively movable parts of said electro-magnetic device is connected, for bodily movement relatively to the valve a circuit for energizing said electro-magnetic device, and manually operable means for closing the circuit.

2. The combination with a vehicle driven by an internal combustion engine having a fuel delivery passage associated therewith together with a valve in said passage controlling the flow of fuel therethrough and a manually operable accelerator with suitable linkage for controlling the position of said valve, of other means controlling the position of said valve independently of the accelerator comprising an electro-magnetic device having a winding and an armature operatively connected to said valve, a device operable responsive to angular speed of a rotating part associated with the engine and having a movable part from which the winding of said electro-magnetic device is supported for bodily movement relative to the valve, a circuit for energizing said electro-magnetic device, a manually operable switch adapted to close said circuit momentarily, a holding circuit for the electro-magnetic device constructed and arranged to close upon momentary closing of the first mentioned circuit, a brake for the vehicle, and means operable responsive to application of the brake to open said holding circuit and thereby de-energize said electro-magnetic device.

3. Apparatus as defined in claim 2 in which the winding of the electro-magnetic device is suspended from the movable part and the armature is biased downwardly thus biasing the valve in a closing direction when the electromagnetic device is de-energized.

4. Apparatus as defined in claim 2 in which the device operable responsive to angular speed of the rotating part comprises means to develop fluid pressure varying as a function of the angular speed of a rotating part associated with the engine, a cylinder having a piston therein from which the winding of the electro-magnetic device is supported and against which the fluid pressure acts when the electro-magnetic device is energized to move the electro-magnetic device and with it the linkage to move the valve controlling the flow of fuel in a closing direction, spring means biasing the piston in a direction to open said valve, and means to limit the pressure developed by the fluid pressure developing means.

5. In apparatus for maintaining a variable predetermined cruising speed of an automotive vehicle having an internal combustion engine with a fuel supply valve and manual means for the operation of said valve and a vehicle brake, the combination of means to develop fluid pressure responsive to the angular velocity of a rotating part associated with the vehicle, a fluid motor having a part movable responsive to variations in said pressure, an electro-magnetic device suspended from said movable part and yieldably connected when energized to said fuel valve, manually operable means for energizing said electro-magnetic device and means operable responsive to moving the brake on the vehicle toward applied position for de-energizing said electro-magnetic means.

6. Apparatus as defined in claim 5 in which the electro-magnetic device comprises a solenoid having a core connected through linkage to the fuel valve with a yieldable connection.

7. Apparatus as defined in claim 5 in which the electro-magnetic device is mounted on the side of a sleeve suspended from the part movable responsive to variations in pressure and in which a plunger slidable in said sleeve is detachably connectable therewith by means of a yieldable latch operated by energization of the electro-magnetic device.

References Cited in the file of this patent

UNITED STATES PATENTS

| | | |
|---|---|---|
| 2,018,426 | Taber | Oct. 22, 1935 |
| 2,021,832 | Callihan | Nov. 19, 1935 |
| 2,230,742 | Bush | Feb. 4, 1941 |
| 2,265,524 | Fruth | Dec. 9, 1941 |
| 2,283,478 | Warren | May 19, 1942 |
| 2,453,054 | Whiffen | Nov. 2, 1948 |
| 2,487,606 | Smith | Nov. 8, 1949 |
| 2,509,358 | Krieg | May 30, 1950 |
| 2,519,510 | Smith | Aug. 22, 1950 |
| 2,554,619 | Goik | May 29, 1951 |
| 2,658,591 | Medlar et al. | Nov. 10, 1953 |
| 2,661,596 | Winslow | Dec. 8, 1953 |
| 2,671,542 | Robnett | Mar. 9, 1954 |
| 2,711,235 | Pokorny | June 21, 1955 |